United States Patent
Chu et al.

(10) Patent No.: US 6,982,882 B2
(45) Date of Patent: Jan. 3, 2006

(54) HIGH VOLTAGE CHARGING CIRCUIT FOR CHARGING A HIGH VOLTAGE CAPACITOR

(75) Inventors: Yi-Shan Chu, Hsinchu (TW); Ming-Nan Chuang, Hsinchu (TW); Yuan-Wen Chang, Hsinchu (TW)

(73) Assignee: Leadtrend Technology Corporation, Hsinchu (TW)

( * ) Notice: Subject to any disclaimer, the term of this patent is extended or adjusted under 35 U.S.C. 154(b) by 37 days.

(21) Appl. No.: 10/919,301

(22) Filed: Aug. 17, 2004

(65) Prior Publication Data

US 2005/0094419 A1    May 5, 2005

(30) Foreign Application Priority Data

Oct. 30, 2003 (TW) .............................. 92130231 A (51) Int. Cl.
*H02M 3/335* (2006.01)
(52) U.S. Cl. .................... 363/21.01; 363/97
(58) Field of Classification Search .................. 363/20, 363/21.01, 21.12, 21.13, 95, 97; 320/166
See application file for complete search history.

(56) References Cited

U.S. PATENT DOCUMENTS

| | | | |
|---|---|---|---|
| 6,362,984 B2 * | 3/2002 | Gekinozu | 363/97 |
| 6,396,718 B1 * | 5/2002 | Ng et al. | 363/21.07 |
| 6,473,317 B1 * | 10/2002 | Simopoulos | 363/21.06 |
| 6,590,789 B2 * | 7/2003 | Bailly | 363/21.12 |

* cited by examiner

*Primary Examiner*—Adolf Berhane
(74) *Attorney, Agent, or Firm*—Bacon & Thomas PLLC (57) ABSTRACT

A high voltage charging circuit includes an activation control circuit, an inactivation control circuit and a power transistor. The activation control circuit is used for controlling an ON time period of the power transistor to enable the transformer to store excited-magnetic energy; the inactivation control circuit is used for controlling an OFF time period of the power transistor to make the transformer to release the excited-magnetic energy and use the excited-magnetic energy to charge the high voltage capacitor. Since the user can select a smaller Lp to keep constant the maximum value $I_{P,max}$ for the primary side current $I_P$, the period $t_{ON}$ can be made smaller as well, which means that a transformer 14 with a smaller volume can be utilized to reduce the entire size of the high voltage charging circuit.

8 Claims, 6 Drawing Sheets

HIGH VOLTAGE CHARGING CIRCUIT FOR CHARGING A HIGH VOLTAGE CAPACITOR

BACKGROUND OF THE INVENTION

1. Field of the Invention

The present invention relates to a high voltage charging circuit and, more particularly, to a high voltage charging circuit for charging a high voltage capacitor.

2. Description of the Related Art

For cameras, when a user needs to take a picture in insufficient light, the camera utilizes a flash to provide extra light to obtain better exposure effects. However, a working voltage (such as 300 volts) of the flash is much higher than a voltage (such as 5 volts) of a direct current used in the camera; therefore, a high voltage charging circuit is utilized to raise the voltage of the direct current by using a transformer with a high transformation ratio to charge a capacitor. When a voltage on the capacitor reaches the working voltage of the flash, the capacitor can be used to provide current to the flash.

Figure 1:
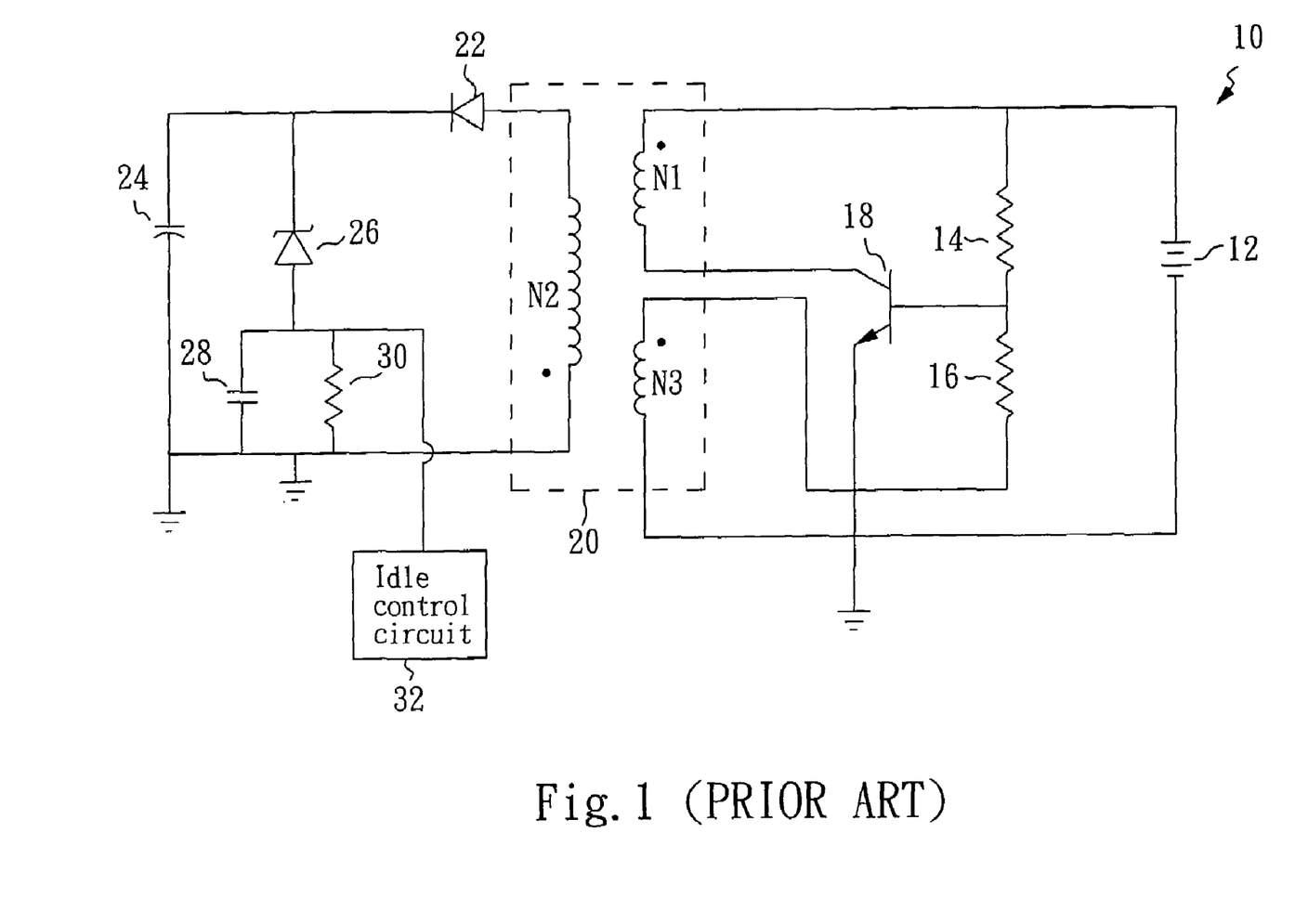
FIG. 1 is a circuit diagram of a conventional high voltage charging circuit 10.

As shown in FIG. 1, a conventional high voltage charging circuit 10, also known as a ring chock converter (RCC), comprises: a direct current power source 12 (for example, a 5 volt supply), three resistors 14, 16, and 30, a power transistor 18, a transformer 20, a diode 22, a high voltage capacitor 24 (for example, a 300 volt capacitor), a Zener diode 26 (with, for example, a breakdown voltage of 300 volts), a capacitor 28, and an idle control circuit 32. The transformer 20 has a primary side winding N1, a secondary side winding N2, and an auxiliary winding N3. The primary side winding N1 and the auxiliary winding N3 induct with the secondary side winding N2; the primary side winding N1 and the secondary side winding N2 are oppositely polarized, and the number of coils on the secondary side winding N2 is N times the number of coils on the primary side winding N1 (e.g. 60 times).

When the direct current power source 12 provides current to the transformer 20, the resistor 14 and the primary side winding N1 are inductive with each other, the power transistor 18 is in a saturated state, and the auxiliary winding N3 and the resistor 14 are inductive with each other. A current passes through the primary side winding N1, which is a magnetically induced current that stores its energy in the transformer 20 instead of charging the high voltage capacitor 24.

When the current passing through the resistor 14 increases, the power transistor 18 moves to an active state, which reduces the current passing through the primary side winding N1, and so the polarities of the primary side winding N1 and the auxiliary winding N3 are reversed. Then, the power transistor 18 transitions into a cut-off state, and the secondary side winding N2 and the diode 22 become inductive with each other to perform a charging process on the high voltage capacitor 24 with a charging current. When the secondary side winding N2 transfers the energy stored in the transformer 20 to the high voltage capacitor 24, the primary side winding N1 goes back to its original state, and becomes inductive with the resistor again.

When the voltage on the high voltage capacitor 24 reaches a predetermined value (for example, 300 volts), this voltage will cause the Zener diode 26 to breakdown and short, which activates the idle control circuit 32 to stop the transformer 20 from charging the high voltage capacitor 24.

Figure 2:
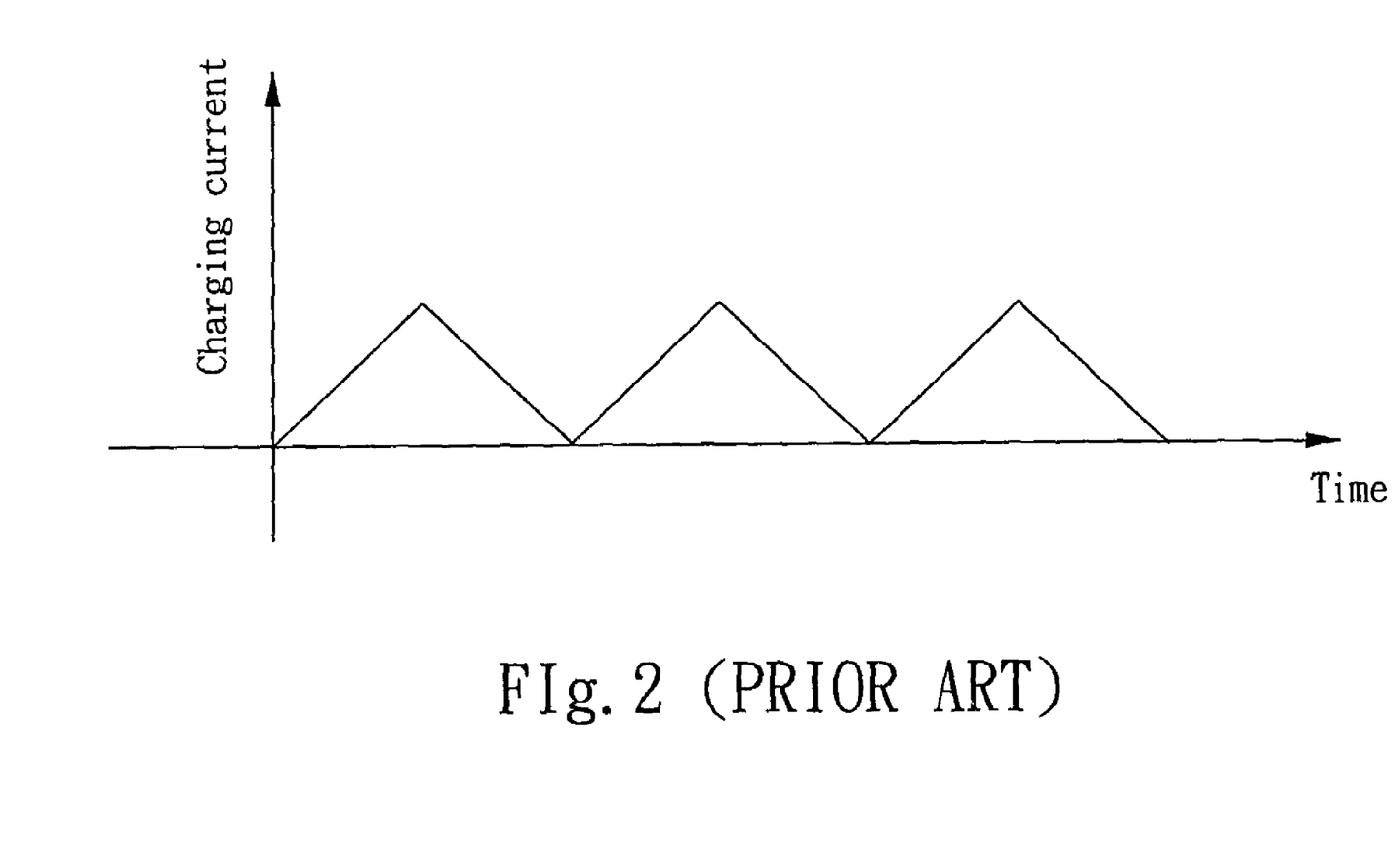
FIG. 2 is a graph of a charging current versus time.

FIG. 2 is a graph of a charging current with time. As shown in FIG. 2, only when the charging current drops back to zero, the transformer 20 starts to provide the charging current to the high voltage capacitor 24 for charging.

Accordingly, the conventional high voltage charging circuit 10 has the following disadvantages:

(1) The power transistor 18 is a BJT, which needs a base-polar driving current, and has a saturation voltage $V_{CE}$ of about 300 mV. Therefore, the power transistor 18 itself wastes a lot of energy and thus leads to a poor charging efficiency of the high voltage charging circuit 10.

(2) Since the transformer 20 needs the auxiliary winding N3, and as the switching frequency of the power transistor 18 is usually 100 kHz, the size of the transformer 20 is not easy to minimize.

(3) Since the conventional high voltage charging circuit 10 does not operate under a continuous conduction mode, it has a low efficiency.

Therefore, it is desirable to provide a high voltage charging circuit for charging a high voltage capacitor to mitigate and/or obviate the aforementioned problems.

SUMMARY OF THE INVENTION

A main objective of the present invention is to provide a high voltage charging circuit that can provide fast charging.

Another objective of the present invention is to provide a high voltage charging circuit that can reduce the size of the transformer.

In order to achieve the above-mentioned objectives of the present invention, the circuit comprises: a direct current power source for outputting a large current with a low voltage value; a transformer for transforming the large current with a low voltage value into a small current with a high voltage value and outputting the high voltage value; a diode for inputting the small current with a high voltage value and then outputting the small current with a high voltage value to the high voltage capacitor to charge the high voltage capacitor; a power transistor; wherein when the power transistor is turned on, the transformer transforms the large current with a low voltage value but does not output the large current with a low voltage value; when the power transistor is turned off, the transformer stops transforming the large current with a low voltage value and outputs the large current with a low voltage value; an activation control circuit for controlling an ON time period of the power transistor; and an inactivation control circuit for controlling an OFF time period of the power transistor; wherein the activation control circuit and the inactivation control circuit control the ON time period or the OFF time period of the power transistor by controlling a positive output signal from a positive end of a flip flop.

Other objects, advantages, and novel features of the invention will become more apparent from the following detailed description when taken in conjunction with the accompanying drawings.

DETAILED DESCRIPTION OF THE PREFERRED EMBODIMENT

Two embodiments are disclosed in the following detailed description.

Figure 3:
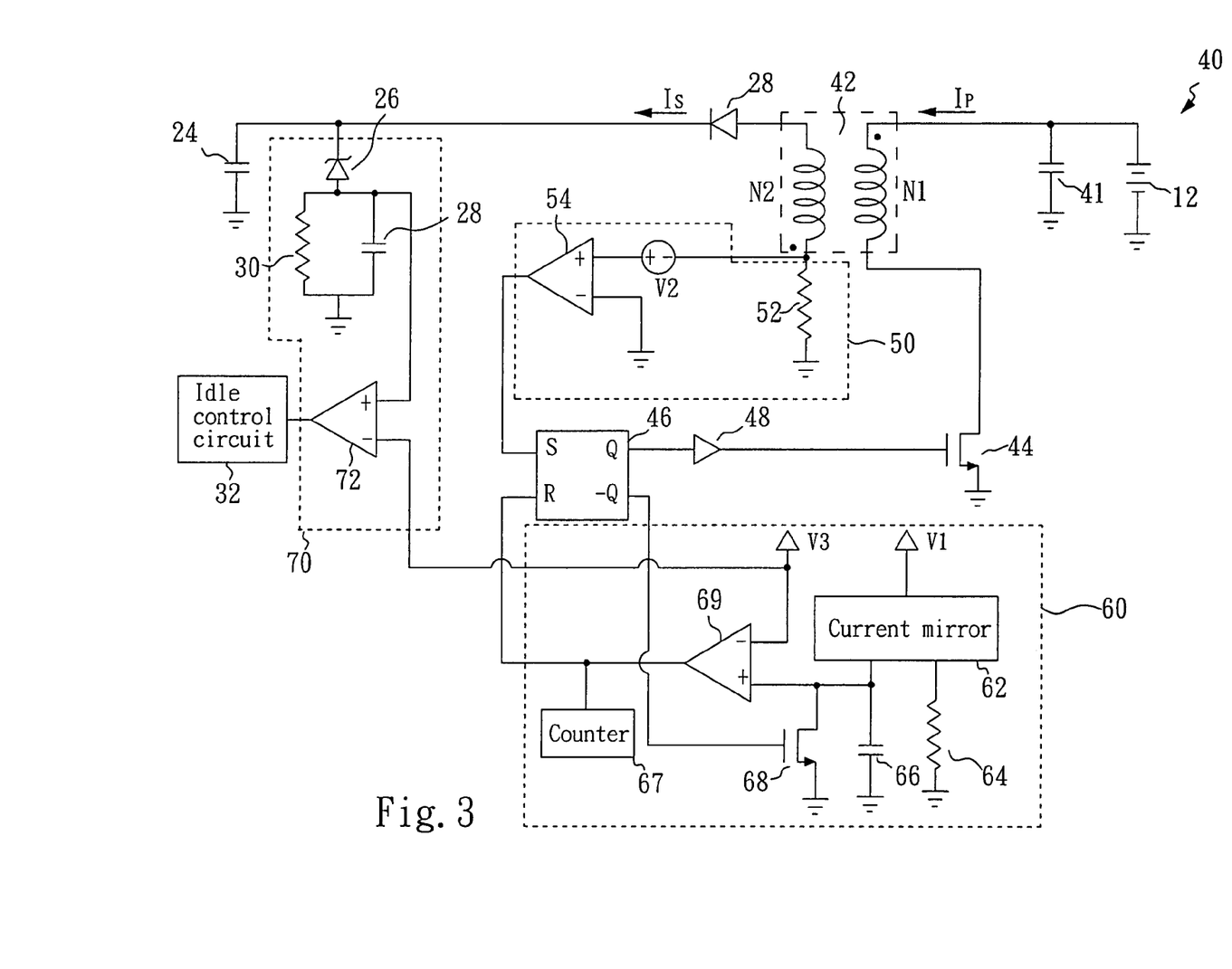
FIG. 3 is a circuit diagram of a high voltage charging circuit in a first embodiment according to the present invention.

First Embodiment:

Please refer to FIG. 3. In this first embodiment, a high voltage charging circuit 40 comprises three circuits: an inactivation control circuit 50, an activation control circuit 60 and an idle detection circuit 70, as well as certain other electronic elements. The activation control circuit 60 outputs a reset signal with a high voltage value so that a positive output signal Q from the positive end of a flip-flop 46 has a high voltage value to control an ON time period for a power transistor 44. The inactivation control circuit 50 outputs a setting signal with a high voltage value so that a positive output signal Q from the positive end of the flip-flop 46 has a low voltage value to control an OFF time period for the power transistor 44. The idle detection circuit 70 is used for detecting a voltage value on a charging capacitor 36, and if the voltage value on the charging capacitor 36 reaches a predetermined voltage value (for example, 300 volts), the idle detection circuit 70 outputs a detection signal to activate an idle control circuit 32 to stop the high voltage charging circuit 40. Subsequently, the high voltage charging circuit 40 stops charging a high voltage capacitor 24. An inductance of a primary side winding N1 of a transformer 42 is $L_p$. An inductance of a secondary side winding N2 is $L_s$. The number of coils on the secondary side winding N2 is N times the number of coils on the primary side winding N1.

After the high voltage charging circuit 40 is switched on, a current of secondary side is Is, and the voltage at two ends of the resistor 52 is zero; since a comparer 52 outputs a setting signal with high voltage value, the setting signal sent into the flip-flop 46 has a high voltage value, and the positive output signal Q from the positive end of the flip-flop 46 has a high voltage value. After being driven by a driver 48, the power transistor 44 is conductive (in a saturated status). By utilizing a current mirror 62, a charging current begins charging an internal capacitor 66 in the activation control circuit 60, and the charging current is equal to the current passing through resistor 64. The capacitor 66 is charged from zero volts. While the voltage across the capacitor 66 is less than a voltage V3, the power transistor 44 is conductive; when the voltage across the capacitor 66 exceeds the voltage V3, a comparer 69 outputs a reset signal with a high voltage value to the reset signal end of the flip-flop 46, and so the positive output signal Q from the positive end of the flip-flop 46 has a low voltage value. After being driven by a driver 48, the power transistor 44 is cutoff (in a cutoff state). Hence, the activation control circuit 60 controls the ON time of the power transistor 44 by controlling a charging time of the capacitor 66. When the power transistor 44 is in the conductive state, the direct current power source 12 provides a primary side current $I_p$ to the transformer 42. Due to the polarity of the secondary side of the transformer 42, the diode 28 does not conduct. Therefore, the energy generated by the primary side current $I_p$ is stored as magnetic energy in the transformer 42. A maximum value $I_{P,max}$ of the primary side current $I_p$ is represented as:

$$I_{P,\max} = \frac{V_{in} - V_{ds}}{L_P} \times t_{ON} \quad (1)$$

wherein $V_{in}$ is an input voltage provided by the direct current power source 12, and $V_{ds}$ is a voltage difference of the power transistor 44. When the power transistor 44 conducts, $V_{ds}$ is so small that it can be ignored; so the formula (1) can be simplified as:

$$I_{P,\max} = \frac{V_{in}}{L_P} \times t_{ON} \quad (2)$$

wherein $V_{in}/L_P$ is a current increasing slope of the primary side current $I_P$, and $t_{ON}$ is an ON time period of the power transistor 44 (which is identical with an ON time of the primary side winding N1, also known as an active time). $t_{ON}$ can be determined by the resistance of the resistor 64 and the capacitance of the capacitor 66, and a value of the charging current for the capacitor 66 is given by a voltage V1 divided by the resistance of the resistor 64. The period $t_{ON}$ can be changed by adjusting the resistance of the resistor 64, which further changes the maximum value $I_{P,max}$ of the primary side current $I_P$. Furthermore, the period $t_{ON}$ can also be changed by having different charging currents. When a user selects the resistance of the resistor 64, the period $t_{ON}$ is thereby fixed as well; according to the formula (2), the smaller $V_{in}$ is, the smaller the maximum value of $I_{P,max}$ for the primary side current $I_P$ is, too. When $V_{in}$ is low, the charging current is low too, and so the high voltage charging circuit 40 can provide different charging modes with different charging currents to increase the life time of the direct current power source 12 with a lower $V_{in}$. Furthermore, in accordance with formula (2), the user can select a smaller Lp to keep constant the maximum value $I_{P,max}$ for the primary side current $I_P$. Therefore, the period $t_{ON}$ can be made smaller as well, which means that a transformer 14 with a smaller volume can be utilized to reduce the entire size of the high voltage charging circuit 40.

When the positive output signal Q from the positive end of the flip-flop 46 has a low voltage value, a negative end of the flip-flop 46 outputs a reserved output signal ~Q with a high voltage value and provides a discharge path by causing the transistor 68 to conduct to remove the energy stored in the capacitor 66.

Accordingly, the capacitor 41 is used as a voltage stabilized capacitor. The power transistor 44 is preferably a N-type field effect transistor, and the gate is connected to the driver 48. This provides the advantages of a fast reaction speed and a lower conductive resistance ($R_{DS\ ON}$). Of course, the power transistor 44 can also be a P-type field effect transistor, and the gate would then be connected to an inverted driver.

In addition, a counter 67 increments a value by one every microsecond ($\mu$S). When the value of the counter 67 exceeds a predetermined value (such as 10), the counter 67 outputs a high voltage value to the reset end of the flip-flop 46 and clears the value. According to the value of the counter 67, the ON time period controlled by the active control circuit 60 is limited, and so the primary side current $I_P$ is also limited to prevent from increasing when the resistor 64 is open.

During the ON time, due to the polarity of the secondary side of the transformer 42, the diode 28 does not conduct.

Therefore, the secondary side current Is of the transformer 42 is zero, and the voltage across the resistor 52 is zero, too. When the voltage across the capacitor 66 exceeds the voltage V3, the flip flop 46 turns off the power transistor 44 (placing it in the cutoff state). After the power transistor 44 is in the cutoff state, the excited-magnetic current of the transformer 42 conducts with the diode 28, and the excited-magnetic energy stored in the transformer 42 charges the high voltage capacitor 24. Therefore, the secondary side current Is of the transformer 42 has a decreasing current. A decreasing rate of the secondary side current Is is equal to Vout (the high voltage value of the high voltage capacitor 24) divided by $L_S$; Ls is the inductance of the secondary side of the transformer 42. Since Vout is slowly increasing during the entire charging process, the decreasing rate of the secondary side current Is will change. When the voltage across the resistor 52 exceeds a voltage V2, the comparer 54 outputs a setting signal with a low voltage value to a setting signal end of the flip flop 46, and the power transistor 44 is placed in the cutoff state. The inactivation control circuit 50 keeps the power transistor 44 in the cutoff state, until the voltage across the resistor 52 is less than the voltage V2; the comparer 54 outputs a setting signal with a high voltage value to the setting signal end of the flip flop 46. Then, the driver 48 causes the power transistor 44 to conduct. This period of non-conduction time of the power transistor 44 caused by the inactivation control circuit 50 is called the OFF time.

The maximum value $I_{S,max}$ of the secondary side current $I_S$ can be represented by the following:

$$I_{S,max} = \frac{N_1}{N_2} \times I_{P,max} \quad (3)$$

When the secondary side current $I_S$ is equal to the voltage V2 divided by the resistance of the resistor 52 (the secondary side current $I_S$ is given as $I_{min}/N$, where $I_{min}$ is a minimum current), the comparer 54 outputs a setting signal with a high voltage value to the setting signal end of the flip flop 46, and the power transistor 44 is in a saturated state, which causes the primary side winding N1 to conduct and the primary side current $I_P$ starts from the minimum current $I_{min}$. By repeating the above-mentioned steps, the transformer 42 can keep charging the high voltage capacitor 24 until the voltage value of the high voltage capacitor 24 reaches the desired 300 volts.

Concerning the idle detection circuit 70, when the voltage value of the high voltage capacitor 24 reaches 300 volts, which causes the Zener diode 26 to break down and charges the capacitor 28 until the voltage drop on the capacitor 28 is larger than the voltage V3, then, the comparer 72 outputs a detection signal to the idle control circuit 32 to stop the high voltage charging circuit 40.

Figure 4:
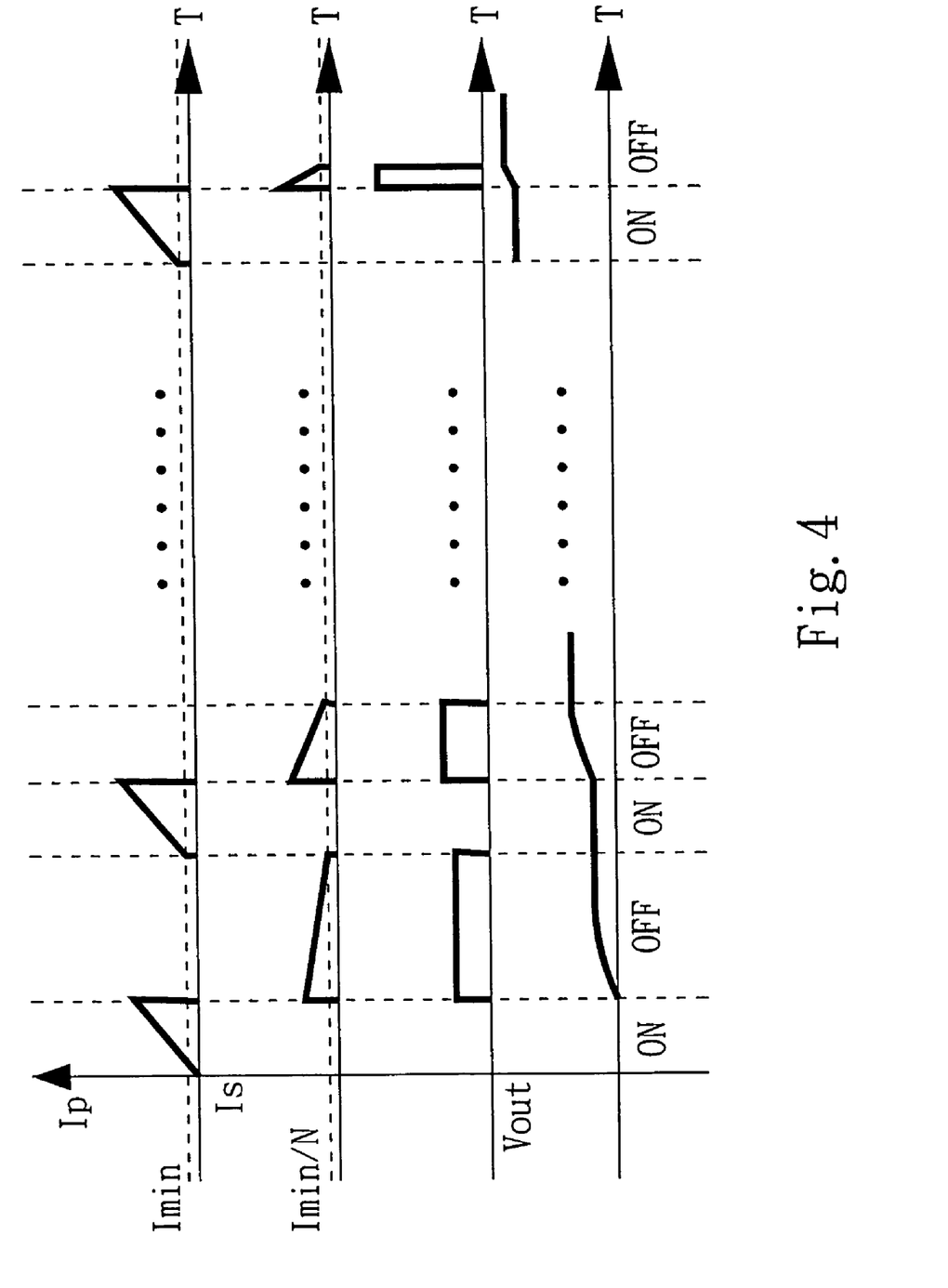
FIG. 4 is a graph of a primary side current, a secondary side current, a charging current and a voltage value of a high voltage capacitor under a continuous charging mode.
Figure 5:
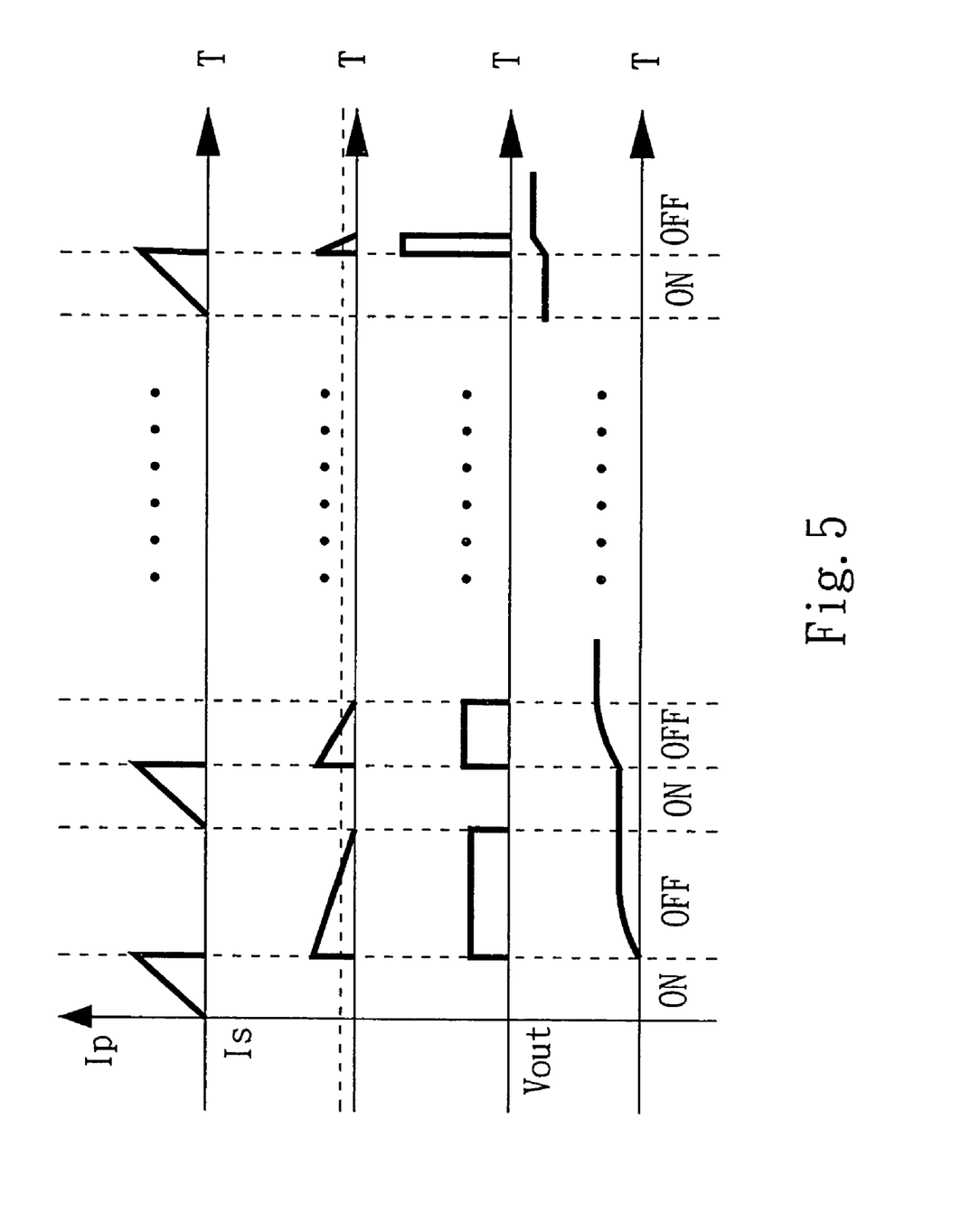
FIG. 5 is a graph of a primary side current, a secondary side current, a charging current and a voltage value of a high voltage capacitor under a boundary charging mode.

Since the minimum current $I_{min}$ can be set up by the user, for example, when the minimum current $I_{min}$ is larger than zero, the high voltage charging circuit 40 continuously charges the high voltage capacitor 24, which is called a continuous conduction charging mode. FIG. 4 shows the differences of the primary side current $I_P$, secondary side current $I_S$, and Vout during the times when the power transistor 44 is on and off. Since the high voltage charging circuit 40 continuously charges the high voltage capacitor 24, a charging efficiency of the high voltage charging circuit 40 is higher than the prior art charging efficiency. Furthermore, the minimum current $I_{min}$ can be set to zero, and the high voltage charging circuit 40 can continuously/discontinuously charge the high voltage capacitor 24, which is called a boundary charging mode. Please refer to FIG. 5. FIG. 5 is a graph of a primary side current, a secondary side current, a charging current and a voltage value of a high voltage capacitor under a boundary charging mode.

Figure 6:
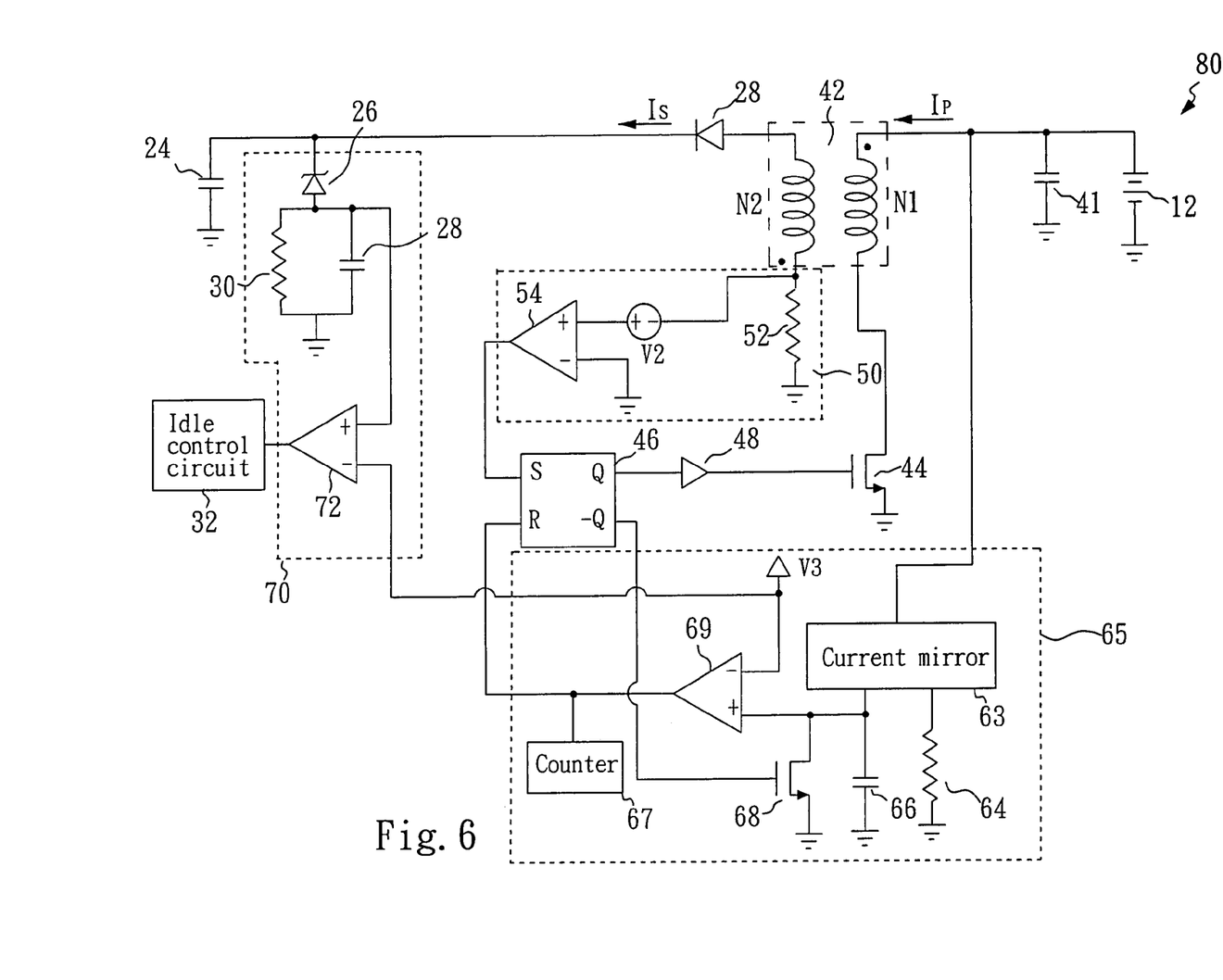
FIG. 6 is a circuit diagram of a high voltage charging circuit in a second embodiment according to the present invention.

Second Embodiment:

A high voltage charging circuit 80 in the second embodiment of the present invention is shown in FIG. 6, which has a structure similar to the high voltage charging circuit 40. The high voltage charging circuit 80 comprises the inactivation control circuit 50, an activation control circuit 65 for replacing the activation control circuit 60 and the idle detection circuit 70. A main difference between the high voltage charging circuit 80 and the high voltage charging circuit 40 is that the current mirror 62 of the activation control circuit 60 is replaced by a current mirror 63 of the activation control circuit 65. The inactivation control circuit 50 and the idle detection circuit 70 operate in a manner similar to the first embodiment, and so require no further description. The charging current for the capacitor 66 is equal to the input voltage $V_{in}$ divided by the resistance of the resistor 64. Therefore, the higher the input voltage $V_{in}$ is, the faster the capacitor 66 will be fully charged, and the shorter the period $t_{ON}$ is. Accordingly, the time period $t_{ON}$ is determined by the resistor 64 and the capacitor 66. On the other hand, the lower the input voltage $V_{in}$ is, the slower the capacitor 66 will be fully charged, and the longer the time period $t_{ON}$ is; in other words, a value of $Vin*t_{ON}$ can be a constant value.

Therefore, the user can change the value of $Vin*t_{ON}$ by changing the resistance of the resistor 64, to change the maximum value $I_{P,max}$ of the primary side current $I_P$. When the resistance of the resistor 64 is fixed, the value of $Vin*t_{ON}$ is fixed as well. According to formula (2), the maximum value $I_{P,max}$ of the primary side current $I_P$ will not be changed by the input voltage $V_{in}$, and so the high voltage charging circuit 80 in the second embodiment of the present invention can provide a almost constant charging current.

Accordingly, the high voltage charging circuits of the present invention have the following advantages:

(1) There is no need for the auxiliary winding N3 of the prior art, and a smaller inductance Lp of the primary side winding N1 will lead to a smaller $t_{ON}$ value, so a small transformer 14 can be utilized to reduce the size of the high voltage charging circuit.

(2) The high voltage charging circuit can be operated in the continuous conduction charging mode, which makes for a higher power transfer efficiency and a shorter charging time.

(3) The high voltage charging circuit can provide a constant current (the charging current will not change with different input voltages $V_{in}$) control or a variable current (the charging current will change with different input voltages $V_{in}$) control, which the user may select.

Although the present invention has been explained in relation to its preferred embodiment, it is to be understood that many other possible modifications and variations can be made without departing from the spirit and scope of the invention as hereinafter claimed.

What is claimed is:

1. A high voltage charging circuit for charging a high voltage capacitor, comprising:

a direct current power source for outputting a large current with a low voltage value;

a transformer for transforming the large current with a low voltage value into a small current with a high voltage value for output;

a diode for inputting the small current with a high voltage value and then outputting the small current with a high voltage value to the high voltage capacitor to charge the high voltage capacitor;

a power transistor; wherein when the power transistor is turned on, the transformer transforms the large current with a low voltage value but does not output the large current with a low voltage value; when the power transistor is turned off, the transformer stops transforming the large current with a low voltage value and outputs the large current with a low voltage value;

an activation control circuit for controlling an ON time period of the power transistor; and an inactivation control circuit for controlling an OFF time period of the power transistor; wherein the activation control circuit and the inactivation control circuit control the ON time period or the OFF time period of the power transistor by controlling a positive output signal from a positive end of a flip flop.

2. The circuit as claimed in claim 1 further comprising an idle detection circuit, when the voltage value exceeds a predetermined value, the idle detection circuit outputs a detection signal to an idle control circuit so that the idle control circuit stops the operation of the transformer.

3. The circuit as claimed in claim 1, wherein the activation control circuit further comprises:
 a resistor;
 a capacitor;
 a current mirror for providing a corresponding current to the capacitor according to a current flow through the resistor to charge the capacitor; and
 a comparer for outputting a reset signal to the flip flop to control the positive output signal from the positive end of the flip-flop to activate the power transistor when a voltage value of the capacitor exceeds a first reference voltage value.

4. The circuit as claimed in claim 3, wherein a negative signal from a negative end of the flip-flop is also capable of activating a transistor that provides a discharging path for the capacitor.

5. The circuit as claimed in claim 1, wherein the inactivation control circuit further comprises:
 a resistor connected to the transformer and providing the small current with a high voltage value from the transformer;
 a power source connected to the resistor and used for providing a second reference voltage; and
 a comparer for outputting a setting signal to control the positive output signal from the positive end of the flip-flop to inactivate the power transistor when the voltage drop is larger than the second reference voltage.

6. The circuit as claimed in claim 1, wherein the inactivation control circuit further comprises:
 a power source connected to the resistor and used for providing a second reference voltage; and
 a comparer having a positive input end connected to a negative end of a primary winding side of the transformer and used for inputting the second reference voltage, wherein when a voltage value of the positive end exceeds a voltage value of the second reference voltage, the comparer outputs a setting signal to control the positive output signal from the positive end of the flip-flop to inactivate the power transistor.

7. The circuit as claimed in claim 2, wherein the idle detection circuit further comprises:
 a bias circuit connected to the high voltage capacitor, wherein when a voltage value of the high voltage capacitor exceeds a predetermined value, the bias circuit outputs a bias voltage;
 a resistor connected to the bias circuit and having a voltage drop equal to the voltage difference between the voltage value of the high voltage capacitor and the voltage value of the bias circuit; and
 a comparer for outputting a detection signal to the idle control circuit to stop the operation of transformer when the voltage difference between the voltage value of the high voltage capacitor and the voltage value of the bias circuit exceeds the third reference voltage.

8. The circuit as claimed in claim 2, wherein the primary side and a secondary side of the transformer have opposite polarities.

* * * * *